US010099637B1

(12) United States Patent
Akella et al.

(10) Patent No.: US 10,099,637 B1
(45) Date of Patent: Oct. 16, 2018

(54) SYSTEM AND METHOD FOR DYNAMIC VEHICLE CUSTOMIZATION AND TUNING

(71) Applicants: Denso International America, Inc., Southfield, MI (US); DENSO CORPORATION, Kariya, Aichi-pref. (JP)

(72) Inventors: Ravi Akella, San Jose, CA (US); Yoshitaka Tanemura, Kariya (JP)

(73) Assignees: DENSO International America, Inc., Southfield, MI (US); DENSO CORPORATION, Kariya, Aichi-pref. (JP)

(*) Notice: Subject to any disclaimer, the term of this patent is extended or adjusted under 35 U.S.C. 154(b) by 0 days.

(21) Appl. No.: 15/727,678

(22) Filed: Oct. 9, 2017

(51) Int. Cl.
*B60W 50/08* (2012.01)
*B60R 16/037* (2006.01)
*B60Q 5/00* (2006.01)
*G08G 1/0967* (2006.01)
*G07C 5/00* (2006.01)
*B60W 40/09* (2012.01)

(52) U.S. Cl.
CPC ............ *B60R 16/037* (2013.01); *B60Q 5/00* (2013.01); *B60W 40/09* (2013.01); *B60W 50/08* (2013.01); *G07C 5/008* (2013.01); *G08G 1/096775* (2013.01); *G08G 1/096783* (2013.01)

(58) Field of Classification Search
None
See application file for complete search history.

(56) References Cited

U.S. PATENT DOCUMENTS

| | | | |
|---|---|---|---|
| 9,229,905 B1 | 1/2016 | Penilla et al. | |
| 9,248,819 B1 | 2/2016 | Tan | |
| 2014/0165159 A1* | 6/2014 | Baade | H04L 63/08 726/4 |
| 2015/0088337 A1* | 3/2015 | Toohy | B60R 16/037 701/1 |
| 2015/0217780 A1* | 8/2015 | Chen | B60R 16/037 701/2 |

* cited by examiner

*Primary Examiner* — Brent Swarthout
(74) *Attorney, Agent, or Firm* — Harness, Dickey & Pierce, P.L.C.

(57) ABSTRACT

A method for dynamic vehicle customization and message generation for a vehicle is disclosed. The method includes receiving static vehicle data, user settings, and vehicle operational data from at least one sensor associated with a vehicle. The method includes determining a signature based on the static vehicle data, the user settings, and the vehicle operational data. The method includes identifying a user profile from a list of user profiles based on the signature. The method includes receiving public edge data from a public edge module and cloud data from a cloud module. The public edge data represents information related to at least one of localized traffic and road conditions, and the cloud data represents information related to at least one of traffic and road conditions of the integrated roadway system. The method includes generating a message based on the user profile, the public edge data, and the cloud data.

20 Claims, 8 Drawing Sheets

SYSTEM AND METHOD FOR DYNAMIC VEHICLE CUSTOMIZATION AND TUNING

FIELD

The present disclosure relates to a system and a method for dynamic vehicle customization and tuning, and more specifically, to a system and method for dynamic vehicle customization and message generation for a vehicle located in an integrated roadway system.

BACKGROUND

This section provides background information related to the present disclosure which is not necessarily prior art.

Using a cloud service, a vehicle may select a user profile associated with the current operator of the vehicle. As an example, all of the user profiles that are authorized to operate the vehicle may be stored in a database of the cloud service. Therefore, when an operator enters the vehicle, the vehicle may communicate identifying indicia associated with the operator, using facial recognition technology or a mobile device, to the cloud service. Subsequently, the cloud service may determine whether a user profile corresponding to the operator exists and is authorized to operate the vehicle. If so, the cloud service may then communicate a signal to the vehicle that allows the operator to drive the vehicle. Furthermore, the cloud service may communicate personalized vehicular settings to the vehicle that are associated with the user profile of the operator.

However, using facial recognition technology and mobile devices can be invasive and can prevent the vehicle from providing customizable, dynamic messages. Furthermore, latency issues that are inherent while utilizing cloud services may delay the communication of critical messages and settings that must either be provided when the vehicle is turned on or while the vehicle is operating.

SUMMARY

This section provides a general summary of the disclosure, and is not a comprehensive disclosure of its full scope or all of its features.

The present teachings include systems and methods for dynamic vehicle customization and tuning for a vehicle located in an integrated roadway system. The method includes receiving, using an electronic control module that includes a processor configured to execute instructions stored on a non-transitory memory, static vehicle data, user settings, and vehicle operational data from at least one sensor associated with a vehicle. The method also includes determining, using the electronic control module, a signature based on the static vehicle data, the user settings, and the vehicle operational data. The method also includes identifying, using the electronic control module, a user profile from a list of user profiles based on the signature. The method also includes receiving, using the electronic control module, public edge data from a public edge module and cloud data from a cloud module, wherein the public edge data represents information related to at least one of localized traffic conditions and localized road conditions, and wherein the cloud data represents information related to at least one of traffic conditions of the integrated roadway system and road conditions of the integrated roadway system. The method also includes generating, using the electronic control module, a message based on the user profile, the public edge data, and the cloud data.

The present teachings also include a system for dynamic vehicle customization and tuning for a vehicle located in an integrated roadway system. The system includes an electronic control module that includes a processor configured to execute instructions stored on a non-transitory memory. The instructions include receiving, using the electronic control module, static vehicle data, user settings, and vehicle operational data from at least one sensor associated with a vehicle. The instructions also include determining, using the electronic control module, a signature based on the static vehicle data, the user settings, and the vehicle operational data. The instructions also include identifying, using the electronic control module, a user profile from a list of user profiles based on the signature. The instructions also include receiving, using the electronic control module, public edge data from a public edge module and cloud data from a cloud module, wherein the public edge data represents information related to at least one of localized traffic conditions and localized road conditions, and wherein the cloud data represents information related to at least one of traffic conditions of the integrated roadway system and road conditions of the integrated roadway system. The instructions also include generating, using the electronic control module, a message based on the user profile, the public edge data, and the cloud data.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1A:
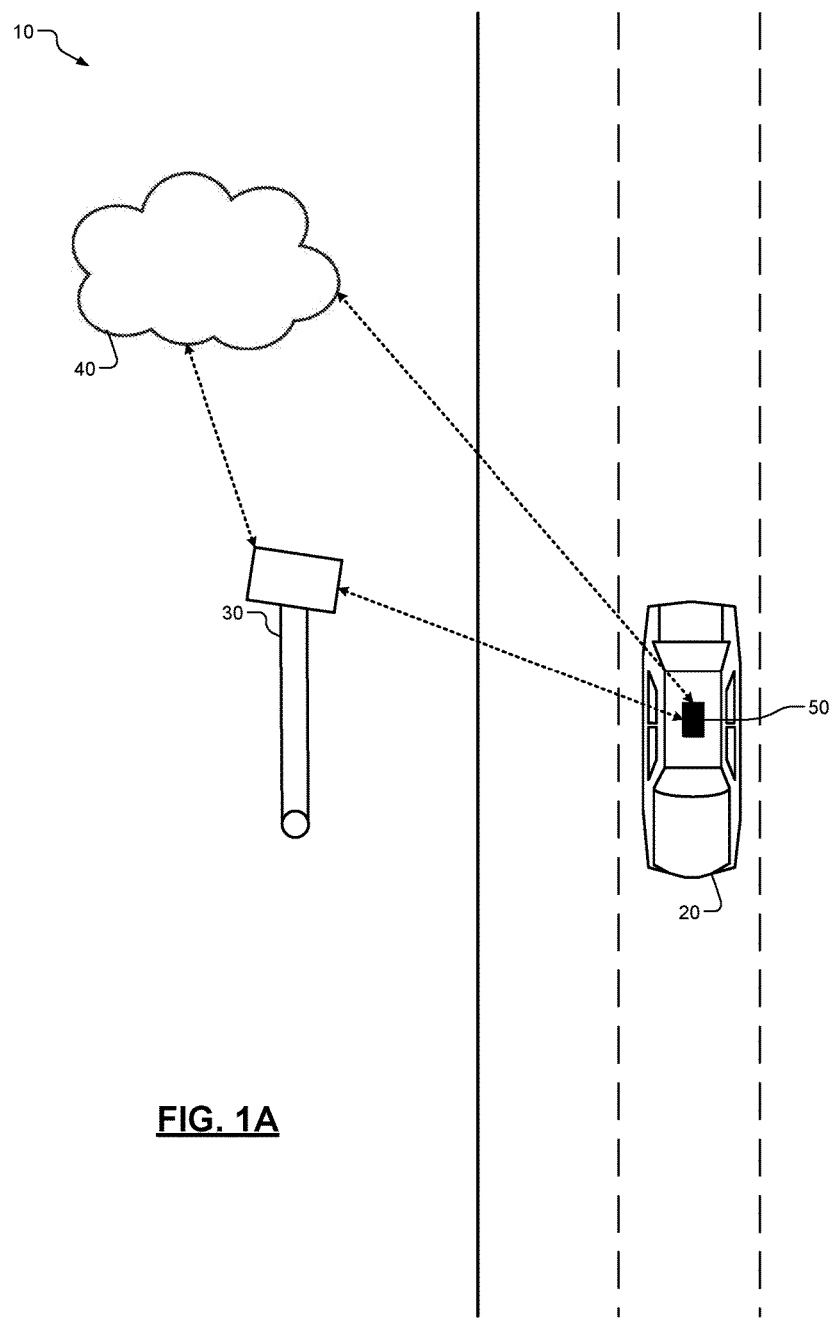
FIG. 1A is an example high-level illustration of an integrated roadway system according to the present disclosure.

With reference to FIG. 1A, an example high-level illustration of an integrated roadway system 10 is shown. The integrated roadway system 10 may include a vehicle 20, a public edge module 30, and a cloud module 40, and the vehicle 20 may include an electronic control module 50. Additionally or alternatively, the integrated roadway system 10 may include multiple public edge modules 30, wherein each of the public edge modules 30 is configured to provide and receive localized information based on, for example, traffic and road information related to a specific street or intersection. Accordingly, a city may incorporate multiple public edge modules 30 in its integrated roadway system 10 that are in communication with nearby vehicles and the cloud module 40. The number of public edge modules 30 may be based on the number of streets and/or intersections, traffic flow, and the layout of the streets. The cloud module 40, on the other hand, may provide and receive general information based on, for example, city-wide traffic flow and road conditions, weather conditions, and the identity of the drivers in the vehicles in the city. As shown in FIG. 1A, the integrated roadway system 10 implements an edge computing system that optimizes vehicle customization and vehicle tuning functions, thereby enabling an operator of the vehicle 20 to quickly and efficiently perform said functions without the inherent latency issues of a cloud computing network.

Figure 1B:
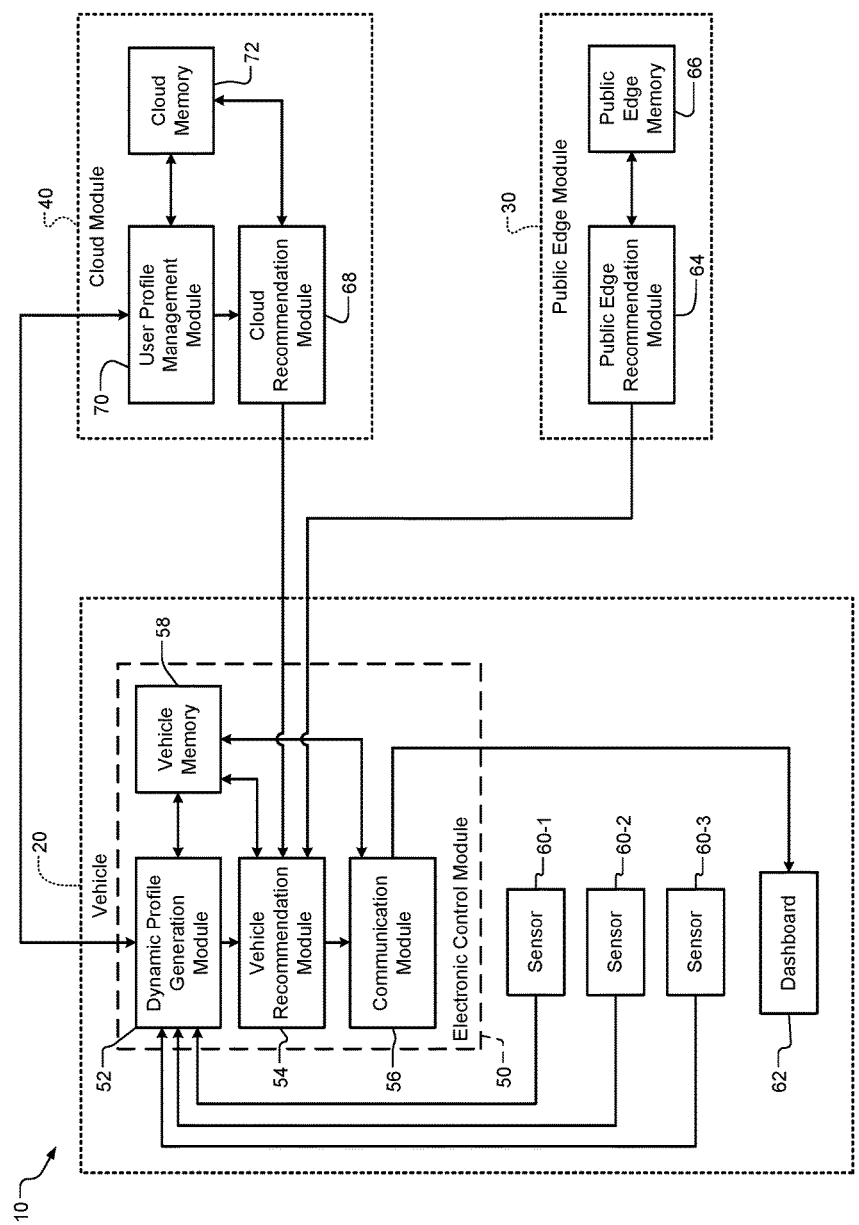
FIG. 1B is an example high-level block diagram of the integrated roadway system according to the present disclosure.

With reference to FIG. 1B, an example high-level block diagram of the integrated roadway system 10 is shown. As described above in FIG. 1A, the vehicle 20 may include the electronic control module 50, and the vehicle 20 may also include a plurality of sensors 60-1, 60-2, 60-3 (collectively referred to as sensors 60) and a dashboard 62. The electronic control module 50 may include a dynamic profile generation module 52, a vehicle recommendation module 54, and a communication module 56. The dynamic profile generation module 52, vehicle recommendation module 54, and the communication module 56 may be implemented by one or more processors that are configured to execute instructions stored in a vehicle memory 58. The vehicle memory 58 may be a computer-readable, non-transitory memory component, such as a read-only memory or a random access memory.

The public edge module 30 may include a public edge recommendation module 64, which is implemented by one or more processors that are configured to execute instructions stored in a public edge memory 66. The public edge memory 66 may be a computer-readable, non-transitory memory component, such as a read-only memory or a random access memory.

The cloud module 40 may include a cloud recommendation module 68 and a user profile management module 70, which are each implemented by one or more processors that are configured to execute instructions stored in a cloud memory 72. The cloud memory 72 may be a computer-readable, non-transitory memory component, such as a read-only memory or a random access memory.

The dynamic profile generation module 52 is configured to perform driver identification and generate customized settings corresponding to the identified driver. As an example, the dynamic profile generation module 52 may identify a signature corresponding to a driver based on static vehicle data, user settings, and vehicle operational data stored in the vehicle memory 58. Static vehicle data may include, for example, a vehicle identification number, a vehicle make, a vehicle trim, engine characteristics, a fuel economy of the vehicle, and/or other identifying vehicle information. User settings may include, for example, mirror positions, a steering wheel position, a seat position, a seat height, a grip position of the steering wheel, and/or other settings associated with a user of the vehicle. The user settings may also include other tuning and/or customization settings, such as speed limits (e.g., a child of a primary driver of the vehicle 20 may have a setting forbidding the child from traveling over 60 mph), zone limits (e.g., the child may not be permitted to drive on certain highways and/or streets), acceleration limits (e.g., the child may not be permitted to quickly accelerate when the vehicle 20 is completely stopped) and/or other tuning and/or customization settings. Vehicle operational data may include any data acquired from the sensors 60, data acquired by an on-board diagnostics port (i.e., OBD-II port), and/or other vehicle operational data. As an example, the data acquired from the sensors 60 and the on-board diagnostics port may include fuel emissions, mileage, velocity, average steering angle, vehicle alignment, brake pressure, rapid acceleration, and whether the vehicle is speeding.

In order to generate the signature, the dynamic profile generation module 52 may perform a variety of algorithms to determine a unique signature for each driver. As an example, each of the static data, user settings, and the vehicle operational data may be stored in a table of the vehicle memory 58 and/or cloud memory 72 as a vector or matrix, from which a unique signature can be determined. Additionally or alternatively, the dynamic profile generation module 52 may implement a standard machine learning algorithm (e.g., an HMM classifier and a Support Vector Machine) on at least one of the static data, user settings, and the vehicle operational data in order to generate the unique signature.

Each signature corresponds to a user profile that is either stored in the vehicle memory 58 or in the cloud memory 72, which may be accessed by the user profile management module 70. The dynamic profile generation module 52 may initially reference the vehicle memory 58 to determine if the profile corresponding with the signature is stored therein, thereby preserving the processing resources of the cloud module 40 and minimizing the latency in identifying the profile. If the dynamic profile generation module 52 determines that the profile corresponding with the signature is not stored in the vehicle memory 58, the dynamic profile generation module 52 may, using the user profile management module 70, search the cloud memory 72 to see if the corresponding profile is stored therein. If the corresponding profile is stored in the cloud memory 72, the dynamic profile generation module 52 may receive, via the user profile management module 70, a signal with the corresponding profile information and/or instructions to update the vehicle memory 58 with the corresponding profile information. If the corresponding profile is neither stored in the vehicle memory 58 nor in the cloud memory 72, the dynamic profile generation module 52 may perform a matching algorithm or create a new profile, as described below in FIG. 2.

As an illustrative example, the driver may enter the vehicle 20 and may adjust the position of the rear-view mirror and the seat height based on the driver's individual preferences. Furthermore, the driver, who, for example, may be a teenager, may have speed limits associated with his profile that forbid the child from traveling over 60 mph. Once the driver turns on the vehicle 20, the dynamic profile generation module 52 may obtain the static vehicle data and the user settings associated with the driver. Once the driver begins to operate the vehicle 20, the dynamic profile generation module 52 may begin to acquire the vehicle operational data based on, for example, data acquired from the sensors 60 and/or the OBD-II port. Once the dynamic profile generation module 52 has obtained a sufficient amount of vehicle operational data, the dynamic profile generation module 52 may determine the signature based on the static vehicle data, the user settings, and the vehicle operational data. Based on the signature, the dynamic profile generation module 52 may then identify the profile associated with the signature (i.e., the teenager's profile).

Once the dynamic profile generation module 52 has identified the driver's profile, the dynamic profile generation module 52 communicates the profile to the vehicle recommendation module 54. The vehicle recommendation module 54 is configured to, based on the driver's profile and messages received from the public edge recommendation module 64 and/or the cloud recommendation module 68, generate customized messages and/or recommendations for the driver. The vehicle recommendation module 54 may receive messages using, for example, a transceiver system that is configured to receive signals from a dedicated short range communication (DSRC) system and/or LTE or other cellular data network.

The public edge recommendation module 64 may be configured to, using a DSRC system and/or LTE or other cellular data signals, transmit messages related to localized traffic and road information. As an example, the public edge recommendation module 64 may transmit a message stating an accident has occurred at the corresponding intersection. As another example, the public edge recommendation module 64 may transmit a message stating that drivers should be aware of a large pothole located in the middle lane.

The cloud recommendation module 68 may be configured to, using a DSRC system and/or LTE or other cellular data signals, transmit messages related to general traffic and road information of the entire integrated roadway system 10. As an example, the cloud recommendation module 68 may transmit a message stating that there is a ten-minute delay on the interstate highway. As another example, the cloud recommendation module 68 may transmit a message stating that it is raining heavily, and therefore, each driver should slow down.

Subsequently, the dashboard 62, which is in communication with the vehicle recommendation module 54, may receive and display the messages generated by the communication module 56.

Using the above examples, based on the profile and the predefined speed limits associated with the teenage driver, and the messages received from the public edge recommendation module 64 and the cloud recommendation module 68, the communication module 56 may generate at least one of the following messages for display on the dashboard 62.

"CAUTION: You are currently operating the vehicle above your allowed speed limit. Please slow down the vehicle to 45 mph due to heavy rain."

"CAUTION: Heavy rain impairing visibility of large pothole ahead in center lane of Washington Avenue. Please slow down the vehicle."

In addition to providing customized tuning and recommendations to the driver of the vehicle, the integrated roadway system 10 may also be configured to implement an incident warning system, a malicious vehicle detection system, a music selection system, an ABS activation system, and/or a speed warning system, as described below with reference to FIGS. 3-7.

Figure 2:
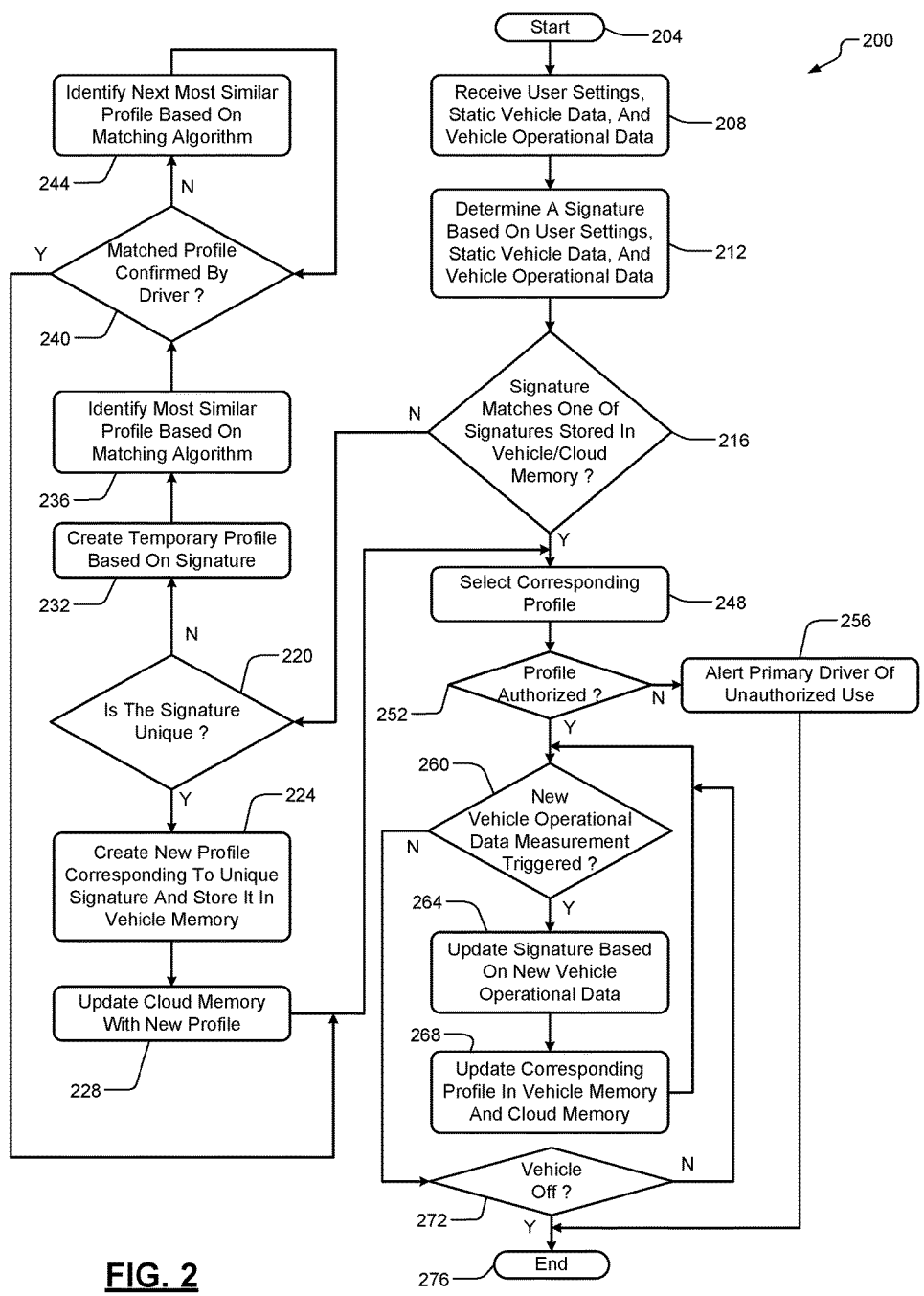
FIG. 2 is a flowchart illustrating dynamic profile generation according to the present disclosure.

With reference to FIG. 2, a flowchart for a control algorithm 200 that illustrates dynamic profile generation is shown. The control algorithm 200 starts at 204 when, for example, the driver of the vehicle turns on the vehicle 20. At 208, the control algorithm 200, using the electronic control module 50, receives the static vehicle data, user settings, and the vehicle operational data from the vehicle memory 58. At 212, the control algorithm 200 determines, using the dynamic profile generation module 52, the signature of the driver based on the user settings, static vehicle data, and the vehicle operational data. At 216, the control algorithm 200 determines whether the signature of the driver is stored in either the vehicle memory 58 or the cloud memory 72. If so, the control algorithm proceeds to 248; otherwise, the control algorithm 200 proceeds to 220.

At 220, the control algorithm 200 determines whether the signature is unique. In other words, the control algorithm 200 determines, using a matching algorithm, whether any the signature in either the vehicle memory 58 and/or the cloud memory 72 match the signature of the driver by a threshold degree of matching. The threshold degree of matching necessary to determine that a signature is not unique is arbitrary and may be based on, for example, the number of profiles and signatures that are stored in the vehicle memory and/or the cloud memory 72 and the various types of data associated with the user settings, static vehicle data, and the vehicle operational data. If the matching algorithm determines that the signature is unique, the control algorithm proceeds to 224; otherwise the control algorithm transfers to 232. At 224, the control algorithm 200 creates a new profile corresponding to the unique signature and stores it in the vehicle memory 58. At 228, the control algorithm 200 updates the cloud memory 72 with the new profile corresponding to the unique signature.

At 232, in response to the control algorithm 200 determining that the signature is not unique, the control algorithm 200 creates a temporary profile based on the signature. At 236, the control algorithm 200 identifies, based on the matching algorithm described above, the most similar profile existing in the vehicle memory 58 and/or cloud memory 72. At 240, the control algorithm 200 determines whether the driver has manually confirmed that the matched profile corresponds to the driver. As an example, the dashboard 62 may display a message asking the driver to verify that he or she is the driver associated with the matched profile. If the matched profile is confirmed by the driver, the control algorithm 200 proceeds to 248; otherwise, the control algorithm 200 proceeds to 244. At 244, the control algorithm 200 identifies, based on the matching algorithm described above, the next most similar profile existing in the vehicle memory 58 and/or cloud memory 72.

At 248, the control algorithm 200 selects the profile corresponding to the driver. At 252, the control algorithm 200 determines whether the driver associated with the selected profile is authorized to drive the vehicle 20. As an example, the primary driver of the vehicle 20 (e.g., the owner of the vehicle) may only permit, as indicated in the corresponding user settings, users associated with certain designated profiles to operate the vehicle 20. Additionally or alternatively, the primary driver of the vehicle 20 may indicate that users associated with certain designated profiles can only operate the vehicle 20 on certain days or during certain times of day. Accordingly, if the control algorithm 200 determines that the profile is associated with a user authorized to operate the vehicle, the control algorithm 200 proceeds to 260; otherwise, the control algorithm proceeds to 256 and, using the communication module 56, transmits a message to the primary driver that an unauthorized operator is using the vehicle 20. Additionally or alternatively, the control algorithm at 256 may disable the vehicle by preventing the vehicle from being operated. As an example, the communication module 56 may transmit a message, using an LTE or other cellular data signal, to the mobile device of the primary driver with a message corresponding to the unauthorized operation of the vehicle 20. The control algorithm 200 ends at 276.

At 260, the control algorithm 200 determines whether a new vehicle operational data measurement should be taken. As an example, the control algorithm 200 may obtain new operational data measurements in response to certain events, such as rapid decelerations, accidents, and a momentary, rapid rotation of the steering wheel. If a new vehicle operational data measurement is triggered, the control algorithm 200 proceeds to 264; otherwise, the control algorithm 200 proceeds to 272. At 264, the control algorithm 200 updates the signature of the selected profile based on the new vehicle operational data. At 268, the control algorithm 200 updates the corresponding profile in the vehicle memory 58 and/or the cloud memory 72 and then returns to 260. At 272, the control algorithm 200 determines whether the vehicle is off. If so, the control algorithm 200 proceeds to 276; otherwise, the control algorithm 200 returns to 260. At 276, the control algorithm 200 ends.

Figure 3:
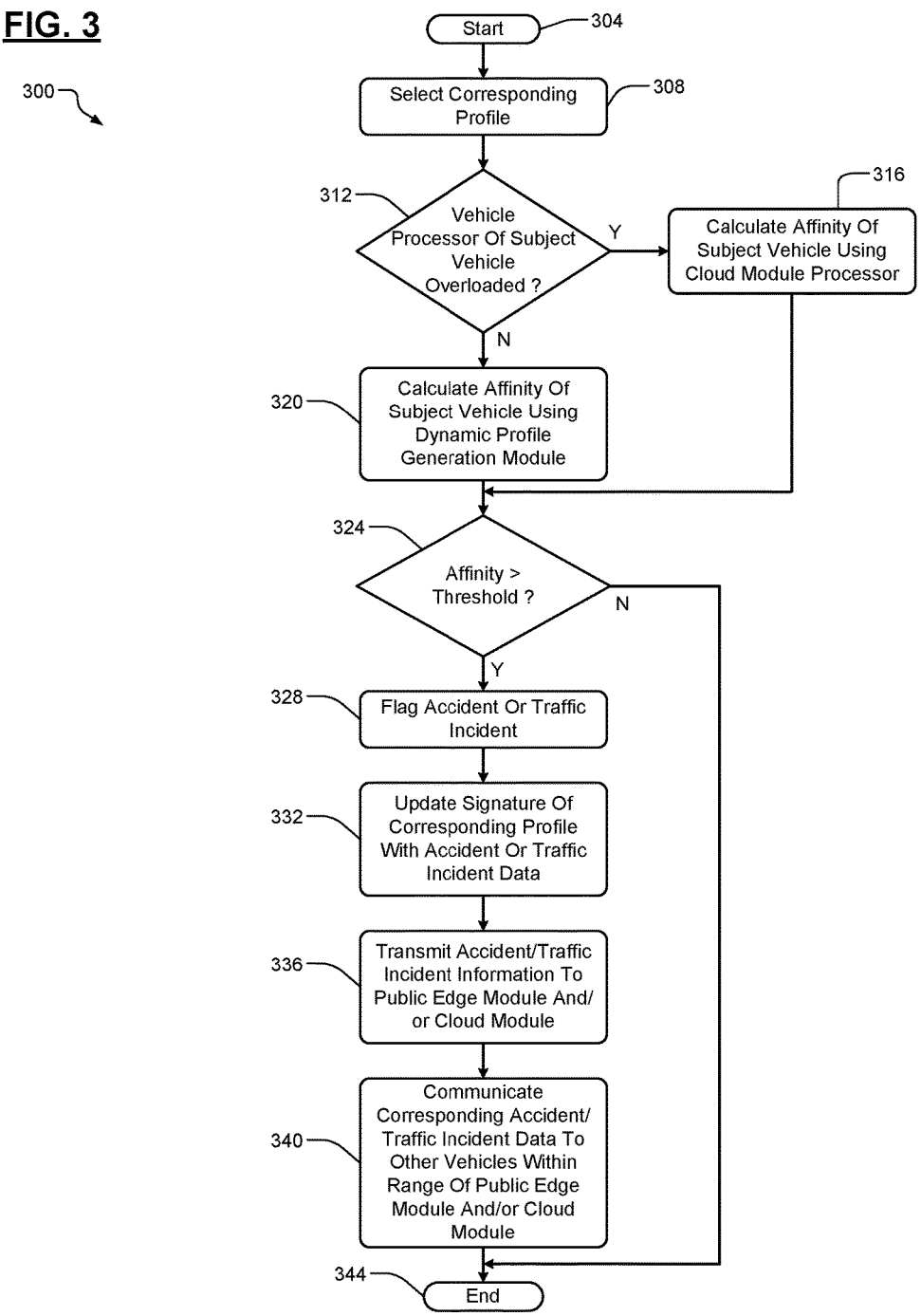
FIG. 3 is a flowchart illustrating the incident warning system of the integrated roadway system according to the present disclosure.

With reference to FIG. 3, a flowchart for a control algorithm 300 that illustrates the incident warning system of the integrated roadway system is shown. The control algorithm 300 starts at 304 when, for example, the driver of the vehicle turns on the vehicle 20. At 308, the control algorithm 300 selects a profile corresponding to the driver. As an example, the profile may be selected, as described above in FIG. 2, in accordance with steps 204-248 of control algorithm 200.

At 312, the control algorithm 300 determines whether the vehicle processor of the vehicle 20 is overloaded or does not have enough available resources to calculate an affinity value, which is described in further detail below. If so, the control algorithm 300 proceeds to 316 and calculates the affinity value of the vehicle using the cloud module processor. Otherwise, the control algorithm 300 proceeds to 320 and calculates the affinity value of the vehicle using the dynamic profile generation module 52.

The affinity value is a value that is indicative of the occurrence of an accident or a traffic incident. As an example, the dynamic profile generation module 52 may receive vehicle operational data that includes the trajectory, speed, acceleration, gas and brake pedal pressures, rotation angles, locations, time, etc., in order to generate an expected path for the subject vehicle 20. Additionally, the dynamic profile generation module 52 may utilize user settings (e.g., speed restrictions) in order to generate the expected path for the vehicle 20. In response to receiving the vehicle operational data and the user settings, the dynamic profile generation module 52 may be configured to perform a machine learning algorithm (e.g., an HMM classifier and a Support Vector Machine) in order to generate the expected path.

If the vehicle 20 deviates from the expected path by a predefined amount (i.e., the affinity value exceeds a threshold affinity value), the dynamic profile generation module 52 may be configured to determine that an accident and/or traffic incident has occurred. As an example, the dynamic profile generation module 52, in response to performing the machine learning algorithm on the vehicle operational data and the user settings, indicates that the expected path of the vehicle 20 is to travel north on Washington Avenue at 45 mph. If the vehicle operational data suddenly indicates that the speed of the vehicle 20 is 0 mph, or that the vehicle 20 rapidly decelerated to 0 mph, this may indicate that the vehicle 20 was involved in a collision in which the driver rear-ended another vehicle, for example. As such, the affinity value may exceed the threshold affinity value, thereby indicating that an accident and/or traffic incident has occurred.

At 324, the control algorithm 300 determines whether the affinity value is greater than the threshold affinity value. If so, the control algorithm 300 proceeds to 328; otherwise, the control algorithm 300 ends at 344. While this embodiment describes a directly proportional relationship between the affinity value and the deviation from the expected path, in other embodiments, an inverse proportional relationship may be used to relate the affinity value and the deviation from the expected path. As such, the smaller the deviation from the expected path, the larger the affinity value may be. Accordingly, in other embodiments, the control algorithm 300 may be configured to determine if the affinity value falls below the affinity threshold.

At 328, the control algorithm 300 identifies that an accident and/or traffic incident has occurred and flags the event. At 332, the control algorithm 300 updates the signature of the corresponding profile with the accident and/or traffic incident data. At 336, the control algorithm 300 transmits, using a DSRC, LTE, or other cellular data signal, the accident and/or traffic incident information to the public edge module 30 and/or the cloud module 40. At 340, the public edge module 30 and/or cloud module 40 communicate the corresponding accident and/or traffic incident data to other vehicles within the range of the public edge module 30 and/or the cloud module 40. As an example, the public edge recommendation module 64 may generate and transmit the following message to each of the respective vehicle recommendation modules 54 of each vehicle within range of the public edge module 30:

"ACCIDENT ALERT: An accident has occurred on Washington Avenue. Please proceed with caution."

Additionally or alternatively, the cloud communication module 68 may generate and transmit the same message to each of the respective vehicle recommendation modules 54 of each vehicle in the integrated roadway system 10. At 344, the control algorithm 300 ends.

Figure 4:
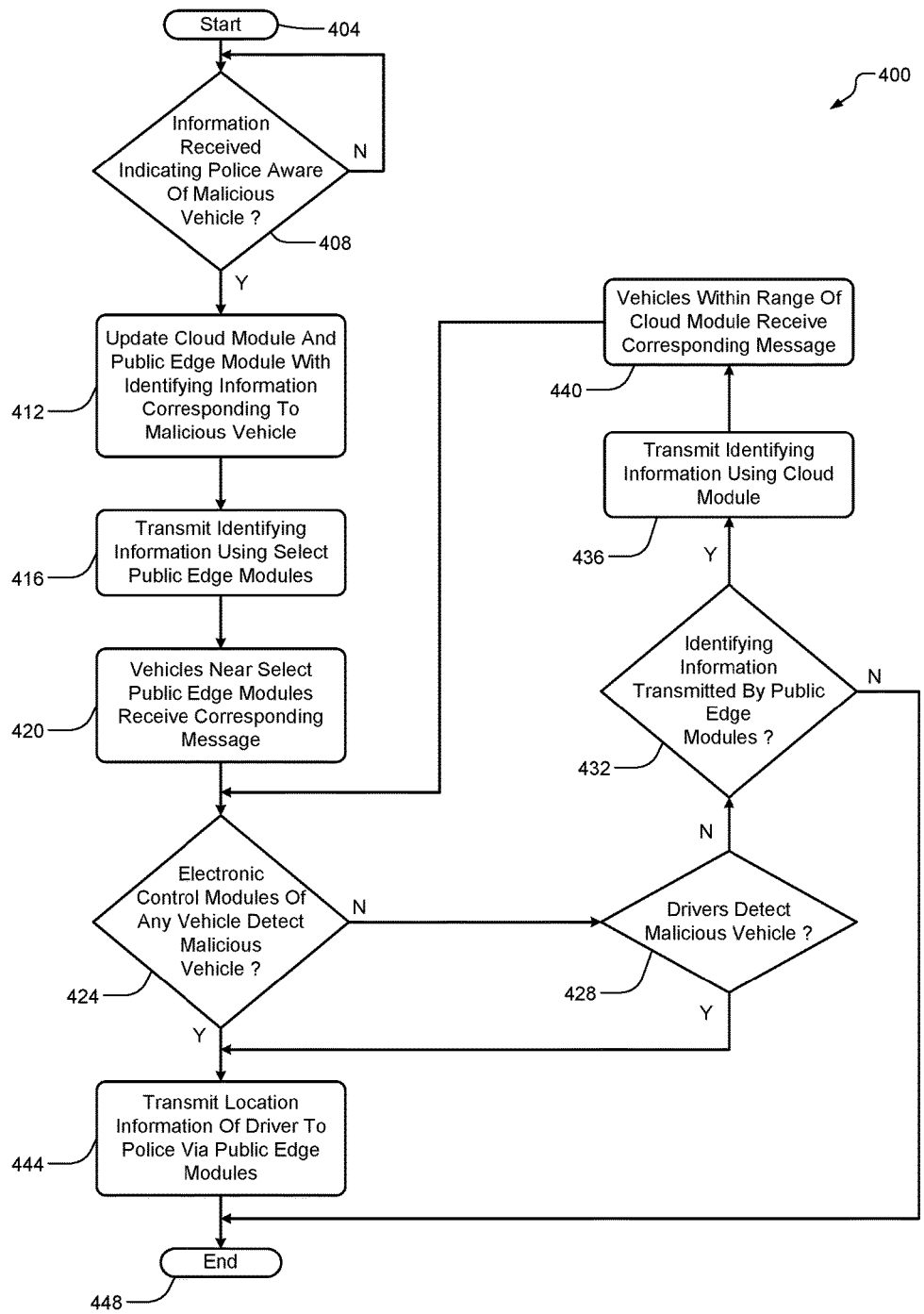
FIG. 4 is a flowchart illustrating the malicious car tracing system of the integrated roadway system according to the present disclosure.

With reference to FIG. 4, a flowchart for a control algorithm 400 that illustrates the malicious car tracing system of the integrated roadway system is shown. The control algorithm 400 starts at 404 when, for example, the driver of the vehicle turns on the vehicle 20. At 408, the control algorithm 400 determines whether information has been received indicating that the police are aware of a malicious vehicle, which is defined as a vehicle of interest to the police as a result of, for example, a warrant for an arrest of the owner of the vehicle, being a suspected getaway vehicle in a recent crime, etc. If the police are aware of a malicious vehicle, the control algorithm 400 proceeds to 412; otherwise, the control algorithm 400 remains at 408 until the police become aware of a malicious vehicle.

At 412, the control algorithm 400 updates the cloud module 40 and the public edge module 30 with identifying information corresponding to the malicious vehicle. As an example, the police may update the cloud module 40 with information related to the malicious vehicle's type, make, color, year of build, license plate number, etc. At 416, the control algorithm 400 transmits the identifying information using select public edge modules 30 located within the police's jurisdiction. As an example, the control algorithm 400 may transmit the identifying information using the public edge module 30 where the malicious vehicle may be located based on tips and the police's own investigative efforts. At 420, vehicles near the selected public edge module 30 receive messages that include the identifying information of the malicious vehicle.

At 424, the control algorithm 400 determines whether the electronic control modules 50 of any vehicle 20 that received the message with the identifying information detects the presence of the malicious vehicle nearby. As an example, the electronic control module 50, which may be in communication with a camera that is coupled to the vehicle 20, may obtain images and/or videos captured by the camera. Subsequently, the electronic control module 50 may determine, using computer vision algorithms, whether the malicious vehicle is nearby. The computer vision algorithms may include, but are not limited to, processing and analyzing images captured by the camera in order to identify the make, trim, color, configuration, license plate number, and/or any other relevant indicia of vehicles that are nearby. If the control algorithm 400 determines that the malicious vehicle is nearby, the control algorithm 400 proceeds to 444; otherwise, the control algorithm 400 proceeds to 428.

At 428, the control algorithm determines whether the driver of any other vehicle 20 that received the message with the identifying information detects the presence of the malicious vehicle nearby. In other words, in response to receiving the message, if the driver, for example, looks over her shoulder and detects the malicious vehicle, the control algorithm 400 proceeds to 444; otherwise, the control algorithm 400 transfers to 432. At 432, the control algorithm 400 determines whether the identifying information was transmitted by the public edge module 30. If so, the control algorithm 400 proceeds to 436; otherwise, the control algorithm 400 transfers to 448. At 436, the control algorithm 400 transmits the identifying information using the cloud module 40. At 440, vehicles within range of the cloud module 40 receive messages that include the identifying information of the malicious vehicle.

At 444, in response to the malicious vehicle being detected, the control algorithm 400 transmits the location of the driver of the other vehicle to the police via the public edge module 30. Accordingly, the police may be able to track the location of and apprehend the driver of the malicious vehicle. At 448, the control algorithm 400 ends.

Figure 5:
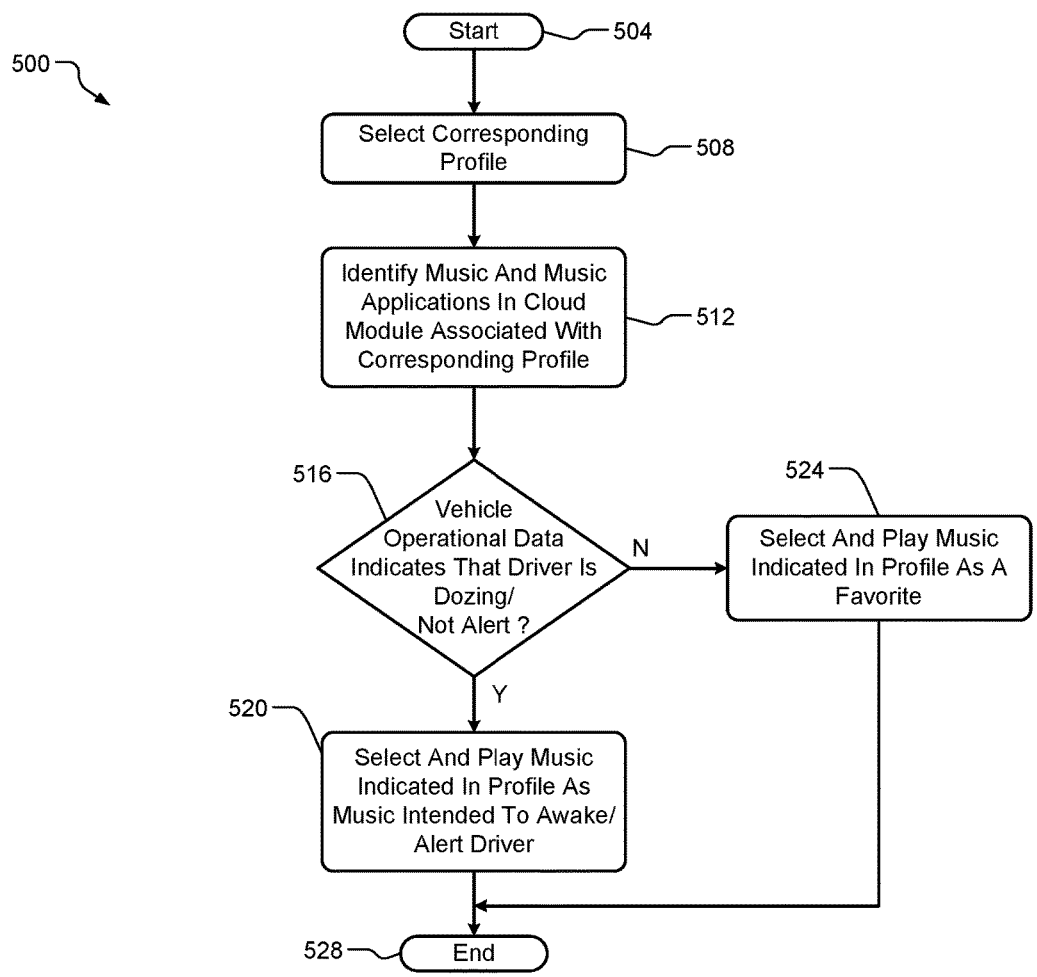
FIG. 5 is a flowchart illustrating the music selection system of the integrated roadway system according to the present disclosure.

With reference to FIG. 5, a flowchart for a control algorithm 500 that illustrates the music selection system is shown. The control algorithm 500 starts at 504 when, for example, the driver of the vehicle turns on the vehicle 20. At 508, the control algorithm 500 selects a profile corresponding to the driver. As an example, the profile may be selected, as described above in FIG. 2, in accordance with steps 204-248 of control algorithm 200.

At 512, the control algorithm 500 identifies music stored in the vehicle memory 58 and music streaming applications in the cloud module 40 that are associated with the selected profile. As an example, a music streaming application, such as APPLE MUSIC® or PANDORA®, may be associated with the selected profile as a result of the driver installing the application on her mobile device. At 516, the control algorithm 500 determines whether the vehicle operational data indicates that the driver is dozing, sleepy, or not alert. As an example, if the vehicle operational data indicates that the driver is drifting out of her lane late at night, the control algorithm 500 may be configured to, using the recommendation module 56, determine that the driver of the vehicle 20 is dozing/not alert. Accordingly, in response to determining that the driver is dozing/not alert, the control algorithm 500 proceeds to 520; otherwise, the control algorithm 500 proceeds to 524.

At 520, the control algorithm 500 selects and plays music that has been previously designated by the driver as music intended to awake/alert the driver in cases of dozing and/or not being alert. As an example, the driver's profile may indicate that if the driver is sleepy, the vehicle 20 should play heavy metal music in order to alert and/or wake the driver. The control algorithm 500 ends at 528. At 524, the control algorithm 500 selects and plays music that has been previously designated by the driver as belonging to her favorite genre of music. As an example, the driver's profile may indicate that rock music is her favorite genre of music, and therefore, to stream various rock stations from the music streaming application in all cases in which she is not dozing and/or not alert. The control algorithm 500 then ends at 528.

Figure 6:
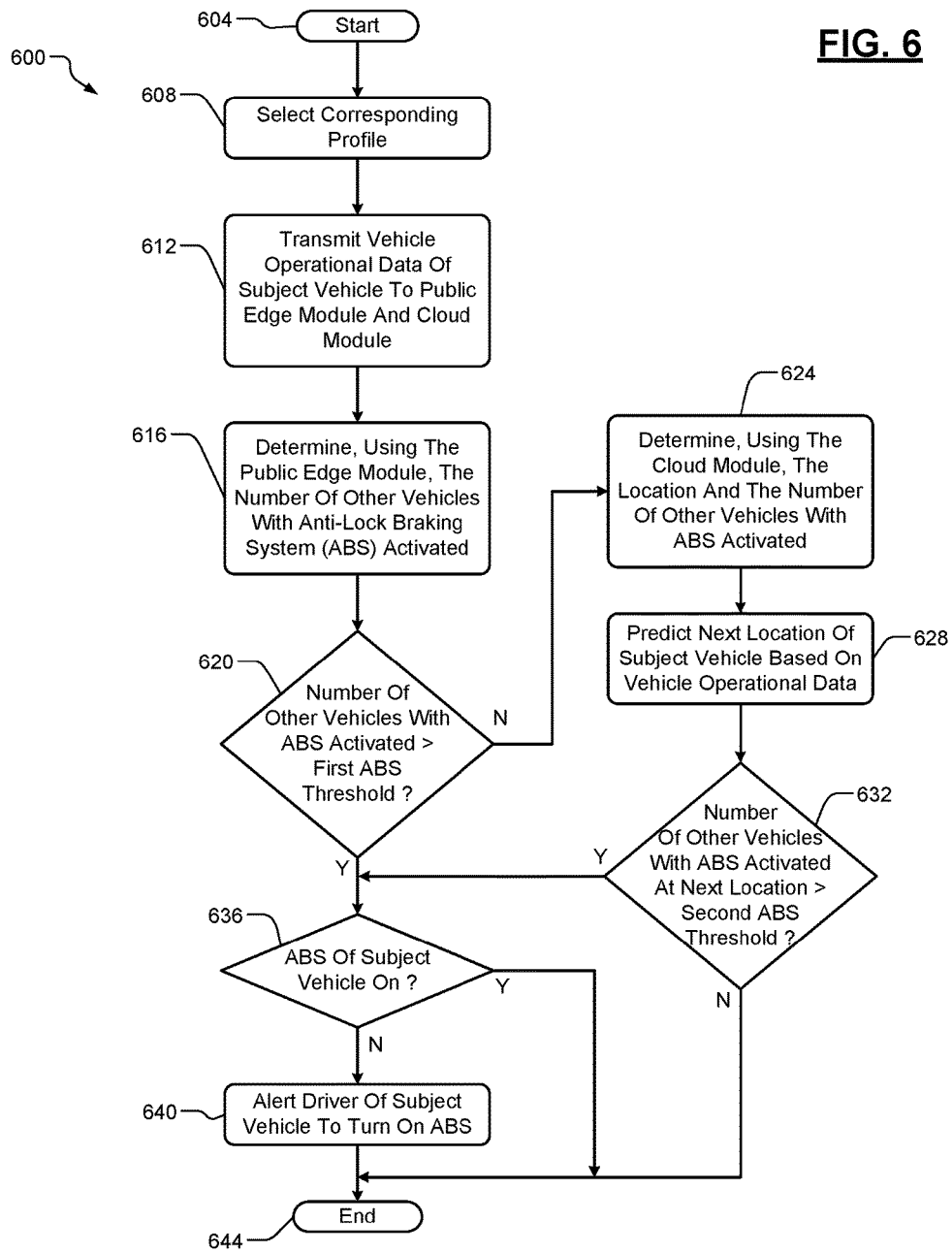
FIG. 6 is a flowchart illustrating an ABS activation system of the integrated roadway system according to the present disclosure.

With reference to FIG. 6, a flowchart for a control algorithm 600 illustrating an ABS activation system is shown. The control algorithm 600 starts at 604 when, for example, the driver of the vehicle turns on the vehicle 20. At 608, the control algorithm 600 selects a profile corresponding to the driver. As an example, the profile may be selected, as described above in FIG. 2, in accordance with steps 204-248 of control algorithm 200.

At 612, the control algorithm 600 transmits the vehicle operational data of the vehicle 20, which includes data corresponding to the status of the anti-lock braking systems (ABS) of the vehicle 20, to the public edge module 30 and the cloud module 40. At 616, the control algorithm 600, using the public edge module 30, determines the number of other vehicles in the vicinity of the vehicle with ABS activated. As an example, the public edge module 30 may be configured to receive vehicle operational data corresponding to the status of the ABS of all other vehicles within the public edge module's range periodically. As a more specific example, the public edge module 30 may be configured to determine the number of vehicles with the ABS activated once per minute. Alternatively, the public edge module 30 may be configured to continuously determine the number of vehicles with the ABS activated.

At 620, the control algorithm 600 determines whether the number of other vehicles with ABS activated exceeds a first ABS threshold. The first ABS threshold may be a raw number or ratio that is predefined at the respective public edge module 30. As an example, the public edge module 30 may set the first ABS threshold at 70% (i.e., 70% of all vehicles within range of the public edge module 30 have their ABS systems activated). Alternatively, the first ABS threshold may be a raw number or ratio that is dynamic and, in other words, constantly updating based on a variety factors, including average speed, number of accidents and/or traffic incidents, weather, road conditions, etc. As an example, the public edge module 30 may decrease the first ABS threshold when the roads are covered with ice and/or snow.

If the public edge module 30 sets the first ABS threshold at 70%, as described above, and the number of vehicles with the ABS activated during the last measurement was 80%, then the control algorithm 600 proceeds to 636. Otherwise, if the number of vehicles with the ABS activated during the last measurement was, for example, 60%, then the control algorithm 600 proceeds to 624.

At 624, the control algorithm 600 determines, using the cloud module 40, the number of other vehicles with the ABS activated within its range and the corresponding location of each vehicle from which it has obtained vehicle operational data corresponding to the ABS status. As an example, the cloud module 40 may generate a data matrix based on the location and number of vehicles with the ABS activated in order to, for example, update the corresponding ABS threshold of that location provided that it is a dynamic threshold.

At 628, the control algorithm 600 predicts the next location of the vehicle 20 based on the vehicle operational data of the vehicle. As an example, the vehicle operational data may include multiple GPS coordinates, and based on these GPS coordinates, the cloud module 40 may be able to predict the trajectory of the vehicle 20. Based on this trajectory, the cloud module 40 may predict the next nearest public edge module that the vehicle 20 is likely to drive near.

At 632, the control algorithm 600 may determine whether the number of other vehicles with the ABS activated at the next predicted location exceeds a second ABS threshold, which is associated with the next nearest public edge module. If the next public edge module sets the second ABS threshold at 60%, and the number of vehicles with the ABS activated during the last measurement was 80%, then the control algorithm 600 proceeds to 636; otherwise, the control algorithm 600 proceeds to 644.

At 636, the control algorithm 600 determines whether the ABS of the vehicle 20 is on. If so, the control algorithm 600 proceeds to 644; otherwise, the control algorithm 600 proceeds to 640. At 640, the control algorithm 600, using the communication module 56 of the electronic control module 50 of the vehicle 20, alerts the driver of the vehicle 20 to turn on its respective ABS. At 644, the control algorithm 600 ends.

Figure 7:
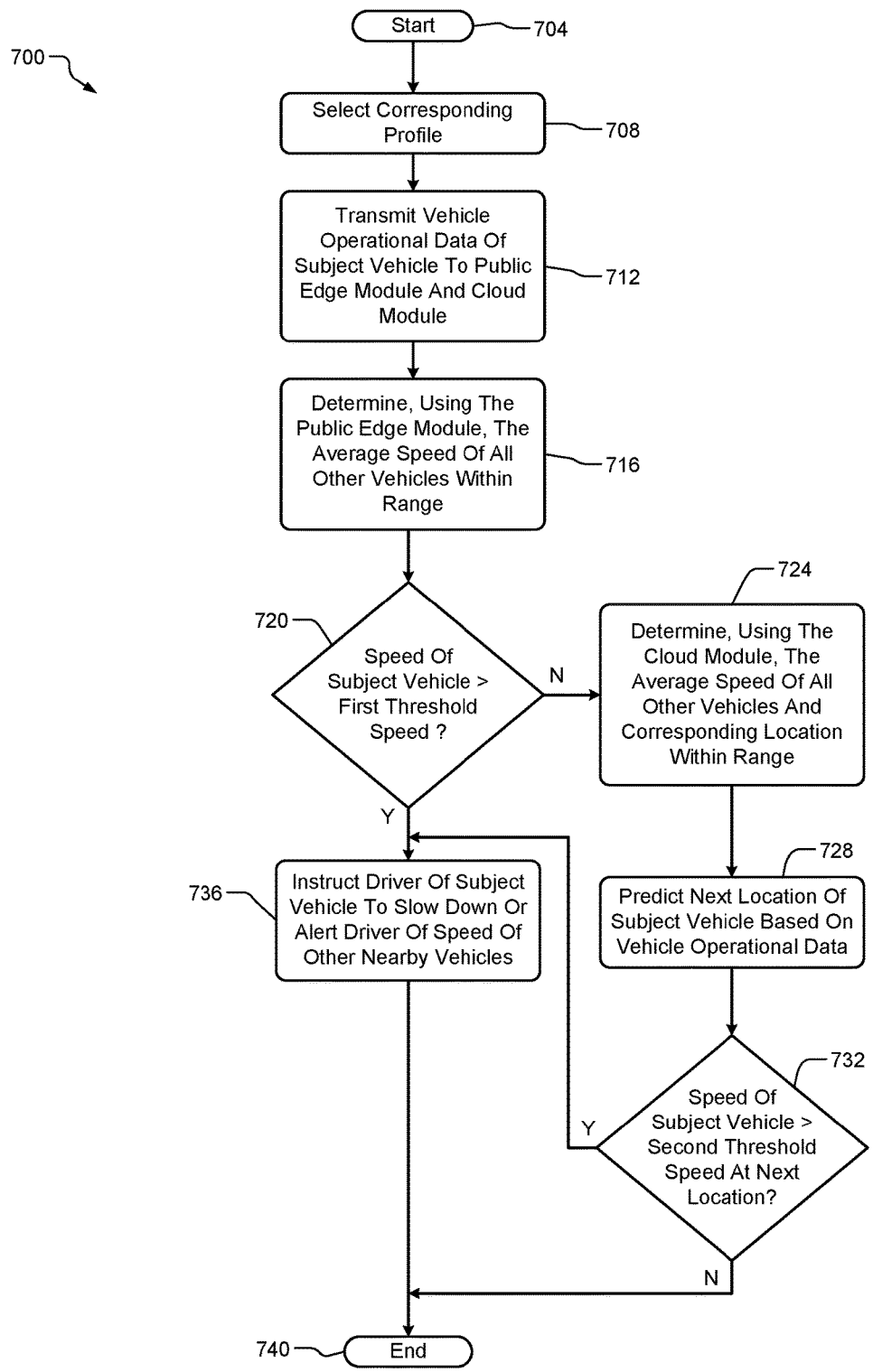
FIG. 7 is a flowchart illustrating a speed warning system of the integrated roadway system according to the present disclosure.

With reference to FIG. 7, a flowchart for a control algorithm 700 illustrating a speed warning system is shown. The control algorithm 700 starts at 704 when, for example, the driver of the vehicle turns on the vehicle 20. At 708, the control algorithm 700 selects a profile corresponding to the driver. As an example, the profile may be selected, as described above in FIG. 2, in accordance with steps 204-248 of control algorithm 200.

At 712, the control algorithm 700 transmits the vehicle operational data of the vehicle 20, which includes data corresponding to the velocity of the vehicle 20, to the public edge module 30 and the cloud module 40. At 716, the control algorithm 700 determines, using the public edge module 30, the average speed of all other vehicles within range of the public edge module 30.

At 720, the control algorithm 700 determines whether the speed of the vehicle 20 exceeds a first threshold speed. The first threshold speed, which is determined by the public edge module 30, may be a predefined speed value based on a recommended or actual speed limit. As an example, the first threshold speed corresponding to the public edge module 30 may be 45 mph if the speed limit of the road near the public edge module 30 is 45 mph. Additionally or alternatively, the first threshold speed may be configured to dynamically update based on, for example, speed limits associated with the selected profile, the speed of other vehicles, a presence of construction nearby, a number of accidents and/or traffic incidents, weather, road conditions, etc. As an example, the first threshold speed corresponding to the public edge module 30 may be 25 mph if the road conditions are dangerous as a result of snow and/or ice, even if the speed limit of the road near the public edge module 30 is 45 mph. If the speed of the vehicle 20 exceeds the first threshold speed, the control algorithm 700 proceeds to 736; otherwise, the control algorithm 700 proceeds to 724.

At 724, the control algorithm 700 determines, using the cloud module 40, the average speed of all other vehicles and the corresponding location of each vehicle from which it has velocity values. As an example, the cloud module 40 may generate a data matrix based on the location and speed of each vehicle in order to, for example, update the corresponding speed threshold of that location.

At 728, the control algorithm 700 predicts the next location of the vehicle 20 based on the vehicle operational data of the vehicle. As an example, the vehicle operational data may include multiple GPS coordinates, and based on these GPS coordinates, the cloud module 40 may be able to predict the trajectory of the vehicle 20. Based on this trajectory, the cloud module 40 may predict the next nearest public edge module that the vehicle 20 is likely to drive near.

At 732, the control algorithm 700 determines whether the speed of the vehicle exceeds a second threshold speed at the next predicted location. If so, the control algorithm proceeds to 736; otherwise, the control algorithm 700 proceeds to 740. At 736, the control algorithm 700 transmits, using the communication module 56 of the electronic control module 50 of the vehicle 20, a message to the dashboard 62 of the vehicle 20 instructing the driver to slow down or to alert the driver of the speed of other nearby vehicles (e.g., "Many drivers around you are traveling at 40 mph due to rainy conditions."). At 740, the control algorithm 700 ends.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method for dynamic vehicle customization and message generation for a vehicle located in an integrated roadway system, the method comprising:

receiving, using an electronic control module that includes a processor configured to execute instructions stored on a non-transitory memory, static vehicle data, user settings, and vehicle operational data from at least one sensor associated with a vehicle;

determining, using the electronic control module, a signature based on the static vehicle data, the user settings, and the vehicle operational data;

identifying, using the electronic control module, a user profile from a list of user profiles based on the signature;

receiving, using the electronic control module, public edge data from a public edge module and cloud data from a cloud module, wherein the public edge data represents information related to at least one of localized traffic conditions and localized road conditions, and wherein the cloud data represents information related to at least one of traffic conditions of the integrated roadway system and road conditions of the integrated roadway system; and generating, using the electronic control module, a message based on the user profile, the public edge data, and the cloud data.

2. The method of claim 1, wherein identifying the user profile further comprises:
comparing, using the electronic control module, the signature to a first signature of a list of signatures;
determining, using the electronic control module and in response to the signature not matching any signature of the list of signatures, whether the signature is unique;
creating, using the electronic control module and in response to the signature being unique, a new user profile corresponding to the signature; and
updating, using the electronic control module, the list of user profiles based on the new user profile.

3. The method of claim 2, wherein identifying the user profile further comprises:
creating, using the electronic control module and in response to the signature not being unique, a temporary user profile based on the signature;
generating, using the electronic control module, a score for each user profile of the list of user profiles, wherein the score is based on a degree of matching of the temporary user profile and a corresponding user profile; and
selecting, using the electronic control module, a first user profile from the list user profiles, wherein the first user profile is selected based on the score for each user profile.

4. The method of claim 1, wherein the vehicle operational data includes data corresponding to an alertness of an operator, and in response to a determination that the operator is not alert, the method includes:
selecting, using the electronic control module, music that is configured to alert the operator, wherein the music is associated with the user profile corresponding to the operator, and wherein the user profile has identified the music as a type of music that is configured to alert the operator.

5. The method of claim 1, wherein the vehicle operational data includes data corresponding to at least one of a steering angle, a brake pressure, a vehicle alignment, a speed, and an affinity value, wherein the affinity value indicates whether the vehicle is involved in a traffic accident.

6. The method of claim 5, wherein the affinity value is based on comparing an actual trajectory of the vehicle and an expected trajectory of the vehicle.

7. The method of claim 5, wherein the method includes:
instructing, in response to the electronic control module determining that the speed of the vehicle exceeds a threshold speed, an operator of the vehicle to reduce the speed of the vehicle, wherein the threshold speed is determined by a speed of at least one other vehicle within a range of the public edge module.

8. The method of claim 1, wherein the static vehicle data includes at least one of a vehicle identification number, a vehicle make, a vehicle trim, engine characteristics, and a fuel economy.

9. The method of claim 1, wherein the user settings include data corresponding to a speed limit, a zone limit, and an acceleration limit.

10. The method of claim 1, wherein:
the localized traffic conditions describe traffic conditions within a range of the public edge module; and
the localized road conditions describe road conditions within the range of the public edge module.

11. A system for dynamic vehicle customization and message generation for a vehicle located in an integrated roadway system, the system comprising:
an electronic control module that includes a processor configured to execute instructions stored on a non-transitory memory, wherein the instructions include:
receiving, using the electronic control module, static vehicle data, user settings, and vehicle operational data from at least one sensor associated with a vehicle;
determining, using the electronic control module, a signature based on the static vehicle data, the user settings, and the vehicle operational data;
identifying, using the electronic control module, a user profile from a list of user profiles based on the signature;
receiving, using the electronic control module, public edge data from a public edge module and cloud data from a cloud module, wherein the public edge data represents information related to at least one of localized traffic conditions and localized road conditions, and wherein the cloud data represents information related to at least one of traffic conditions of the integrated roadway system and road conditions of the integrated roadway system; and
generating, using the electronic control module, a message based on the user profile, the public edge data, and the cloud data.

12. The system of claim 11, wherein identifying the user profile further comprises:
comparing, using the electronic control module, the signature to a first signature of a list of signatures;
determining, using the electronic module and in response to the signature not matching any signature of the list of signatures, whether the signature is unique;
creating, using the electronic module and in response to the signature being unique, a new user profile corresponding to the signature; and
updating, using the electronic control module, the list of user profiles based on the new user profile.

13. The system of claim 12, wherein identifying the user profile further comprises:
creating, using the electronic control module and in response to the signature not being unique, a temporary user profile based on the signature;
generating, using the electronic control module, a score for each user profile of the list of user profiles, wherein the score is based on a degree of matching of the temporary user profile and a corresponding user profile; and
selecting, using the electronic control module, a first user profile from the list user profiles, wherein the first user profile is selected based on score for each user profile.

14. The system of claim 11, wherein the vehicle operational data includes data corresponding to an alertness of an operator, and in response to a determination that the operator is not alert, the instructions further include:
selecting, using the electronic control module, music that is configured to alert the operator, wherein the music is associated with the user profile corresponding to the operator, and wherein the user profile has identified the music as a type of music that is configured to alert the operator.

15. The system of claim 11, wherein the vehicle operational data includes data corresponding to at least one of a steering angle, a brake pressure, a vehicle alignment, a speed, and an affinity value, wherein the affinity value indicates whether the vehicle is involved in a traffic accident.

16. The system of claim 15, wherein the affinity value is based on comparing an actual trajectory of the vehicle and an expected trajectory of the vehicle.

17. The system of claim 15, wherein the instructions further include:
- instructing, in response to the electronic control module determining that the speed of the vehicle exceeds a threshold speed, an operator of the vehicle to reduce the speed of the vehicle, wherein the threshold speed is determined by a speed of at least one other vehicle within a range of the public edge module.

18. The system of claim 11, wherein the static vehicle data includes at least one of a vehicle identification number, a vehicle make, a vehicle trim, engine characteristics, and a fuel economy.

19. The system of claim 11, wherein the user settings include data corresponding to a speed limit, a zone limit, and an acceleration limit.

20. The system of claim 11, wherein:
- the localized traffic conditions describe traffic conditions within a range of the public edge module; and
- the localized road conditions describe road conditions within the range of the public edge module.

* * * * *